United States Patent [19]

Schwarz et al.

[11] 4,332,133

[45] Jun. 1, 1982

[54] COMPRESSOR BLEED SYSTEM FOR COOLING AND CLEARANCE CONTROL

[75] Inventors: Frederick M. Schwarz, Glastonbury; James G. Griffin, West Hartford; Vytautis P. Gudaitus, Bristol, all of Conn.

[73] Assignee: United Technologies Corporation, Hartford, Conn.

[21] Appl. No.: 94,251

[22] Filed: Nov. 14, 1979

[51] Int. Cl.³ .......................... F02C 3/06; F02C 7/18; F02C 7/28
[52] U.S. Cl. .................................. 60/39.75; 415/115; 415/116; 415/173 R
[58] Field of Search .................. 60/39.75; 415/172 A, 415/173 R, 115, 116

[56] References Cited

U.S. PATENT DOCUMENTS

| | | | |
|---|---|---|---|
| 3,584,458 | 6/1971 | Wetzler | 60/39.75 |
| 3,733,146 | 5/1973 | Smith et al. | 415/172 A |
| 3,972,181 | 8/1976 | Swayne | 415/116 |
| 4,069,662 | 1/1978 | Redinger et al. | 60/39.75 |
| 4,187,054 | 2/1980 | Landis et al. | 415/115 |
| 4,213,738 | 7/1980 | Williams | 415/115 |
| 4,217,755 | 8/1980 | Williams | 415/115 |

*Primary Examiner*—Robert E. Garrett
*Attorney, Agent, or Firm*—Norman Friedland

[57] ABSTRACT

To improve on thrust specific fuel consumption for a gas turbine engine, compressor bleed for turbine cooling is divided into an air distribution system where at least one duct is valved and the other is continuously flowing restrictively with the excess air passing through the turbine mixing with gas path air in the vicinity of the rotating turbine labyrinth type seal to assure seal cooling with sufficient heating of the rotating parts to achieve minimum gap clearance of the seal.

6 Claims, 2 Drawing Figures

4,332,133

COMPRESSOR BLEED SYSTEM FOR COOLING AND CLEARANCE CONTROL

BACKGROUND OF THE INVENTION

This invention relates to gas turbine engines and particularly to a cool air system for cooling components in the turbine section and controlling the gap of the lentricular seal.

As is well known, the advent of the high cost of fuel coupled with a need to conserve energy has caused the gas turbine industry to undergo an extensive program to develop engines so as to improve thrust specific fuel consumption (TFSC). To this end the cooling means for the turbine section which typically bleeds air from the compressor section is the concern of this innovation. Historically, the air from the compressor was fed directly into the area of the turbine section to cool its working components and particularly the turbine vanes and blades. Turbine vane and blade cooling has developed in a complex and sophisticated art in and of itself. But suffice it to say for purposes of this invention, that it is necessary to supply a large volume of air to the turbine section particularly to accommodate the high pressure drop incidental to the passage of flow through the multiple internal passages and apertures in the vanes. Obviously, during takeoff, when engine power demand is at its highest peak, the amount of air required is far more than the amount required at a lesser power demand, say during cruise.

To accommodate the difference in demands, we have found that we can conserve on compressor air with a consequential improvement on TSFC by having at least two different ducts connected to the compressor station being bled and one being valve operated and the other being continuous feed but having flow restriction. The flow restriction assures that the amount of air being fed by the continuous feed duct does not increase appreciatively when the valve is closed, since both ducts are fed from the same source.

Additionally, the amount of air selected from the continuous feed duct is sufficient to cool the gas path air only enough to cool the lenticular seal, but yet leaving the mixed air warm enough to close the gap thereof and minimize gas flow leakage, with a consequential additional improvememt in TSFC.

SUMMARY OF THE INVENTION

An object of this invention is to provide an improved compressor bleed system to the turbine section of a gas turbine engine.

A feature of this invention is to provide in a cool air feed system as described at least two separate ducts, one being valved and the other being continuous, wherein the continuous feed duct is flow restrictive.

Another feature of this invention is to provide the means for mixing the cool air from said feed system with gas path air to the lenticular seal to adjust the temperature thereof for proper structural cooling and minimizing the gap clearance thereof.

Other features and advantages will be apparent from the specification and claims and from the accompanying drawings which illustrate an embodiment of the invention.

DESCRIPTION OF THE PREFERRED EMBODIMENT

While the invention in its preferred embodiment is particularly concerned with the cooling arrangement of the JT9D gas turbine engine manufactured by Pratt and Whitney Aircraft Group, division of United Technologies Corporation, it is to be understood that the scope of the invention is not limited thereto, but the details of that engine are incorporated herein by reference.

Figure 1:
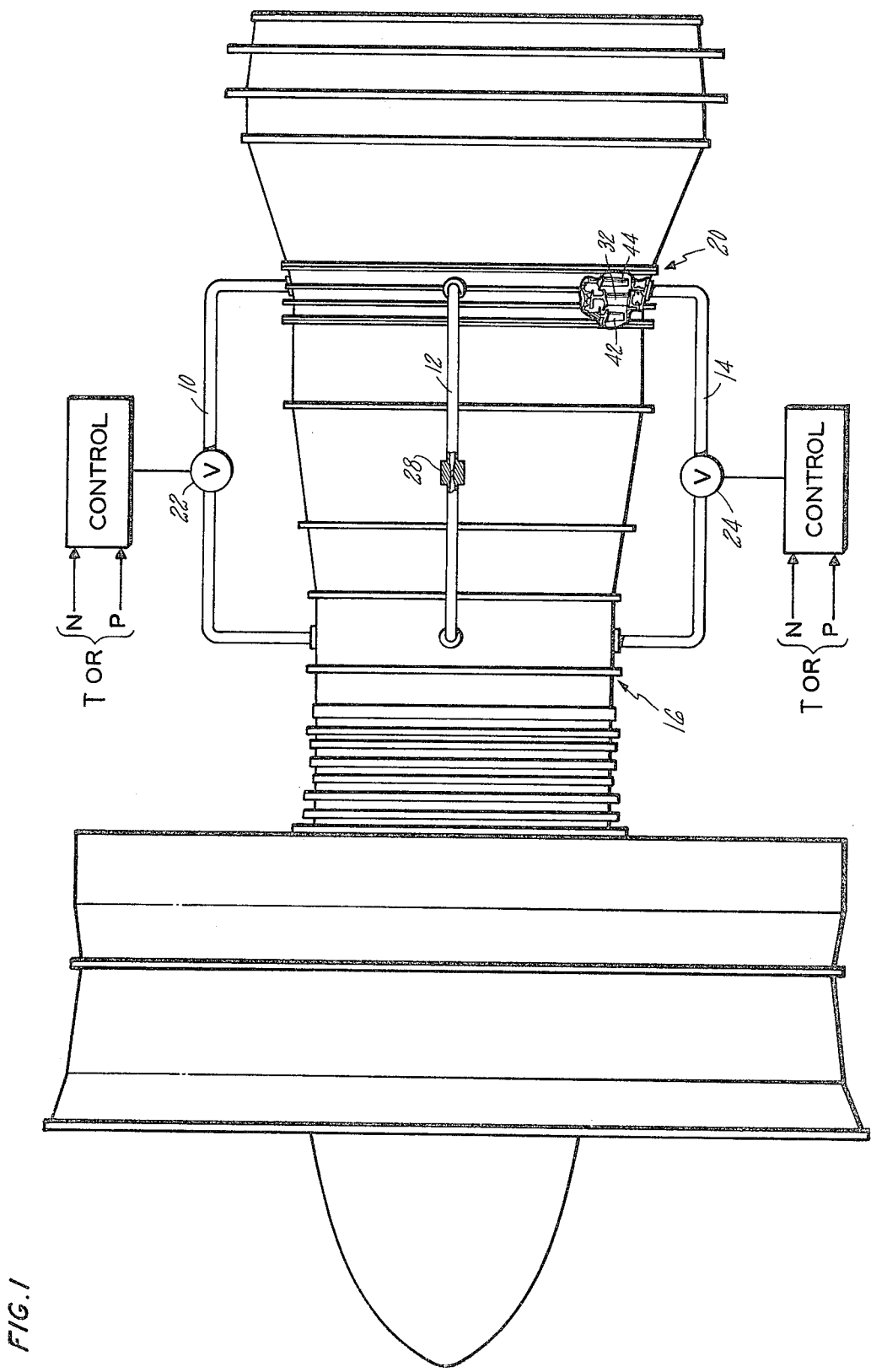
FIG. 1 is a side elevation of a fan-jet engine partly in section showing the plumbing of this invention.

In this particular arrangement, and referring to FIG. 1, four ducts (10, 12, 14 and one not being shown) are connected into the compressor section 16 of the gas turbine engine and although not shown, communicate with a manifold that surrounds the thirteenth stage thereof and directs the cool air into the second stage of the high pressure turbine section 20. As noted suitable valves 22 and 24 are disposed in ducts 10 and 14 respectively and each have suitable controls responding to aircraft or engine operating parameters for positioning the valves either open or closed. In this instance high rotor speed ($N_2$) and barometric pressure (P) are sensed in any well known manner and close the valves 22 and 24 at a certain value that would be commensurate with cruise condition. Alternately, it is contemplated that compressor discharge temperature or any other temperature downstream of the compressor (T) could equally be utilized to indicate the lower power setting.

Duct 12 carries flow restrictor 28 and the duct (not shown) in the opposite side of the engine likewise is so restricted. This insures a continuous flow while assuring that the flow in the ducts will not increase appreciatively when valves 22 and 24 are closed off. Otherwise the continuous feed ducts would tend to make up for the total flow upon valve closure. It should be understood that it is within the scope of the invention to design the duct, per se, to include the restrictive feature without the use of an orifice, or otherwise valve the duct but limit its closure so that it always leaks the desired amount during the off-power condition. Obviously, it is important that during the off-power condition the compressor will only deliver the requisite flow to achieve the desired cooling effect and gap closure effect as will be more apparent from the description to follow.

Figure 2:
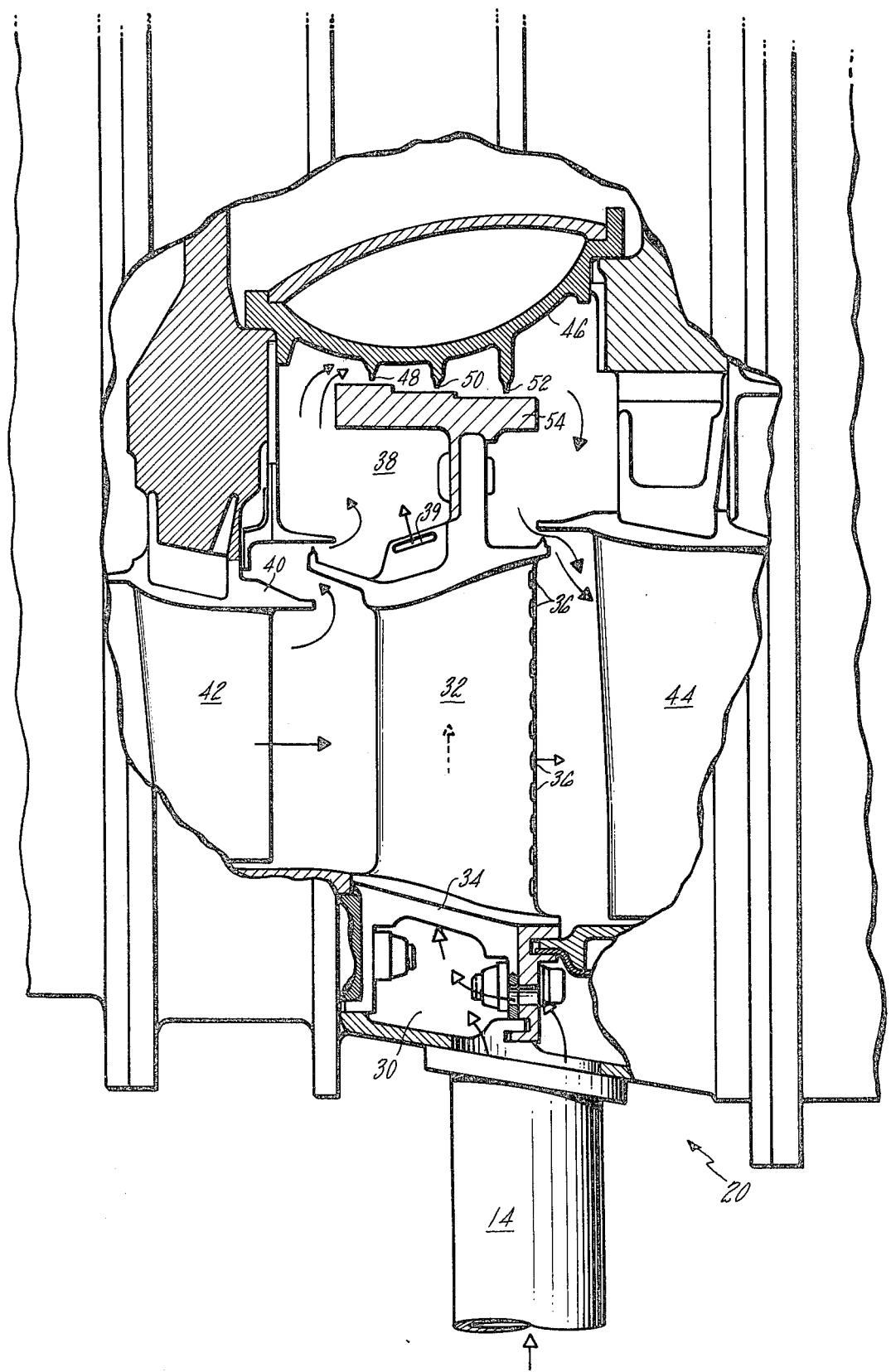
FIG. 2 is a partial view of a blown up portion taken in section showing the details of the flow pattern for clearance control of the lenticular seal.

As noted from FIG. 2, compressor air admitted via duct 14 into cavity 30 is fed internally of vane 32 through drilled passages formed in the platform 34. The spent portion of the compressed air internally of vane 32 is vented into the gas path via openings 36 formed on the trailing edge. A portion of the compressed air is discharged from opening 39 formed in vane 32 into the cavity 38 where it mixed with a portion of gas path air leaking around the root section 40 of turbine blade 42. Obviously there exists a pressure drop between the gas path pressure at turbine blade 42 and the gas path pressure at turbine blade 44 with a consequential pressure drop across the lenticular seal 46. The reduction of cooling air inherently causes an increase in gas path air, heating the seal and hence causes it to expand and reduce the gap. It is manifest to maintain the flow in this area (cavity 38) at a minimum as its energy is not extracted by the turbine buckets and hence, represents a loss in turbine efficiency. To this end, the amount of air selected to flow through orifice 39, which is a function of the air bled from the compressor, is just enough to maintain the temperature around seal 46 such that it keeps the seal within its temperature integrity and yet maintain a minimum gap clearance between the knife edges 48, 50 and 52, and the stepped platen 54. As is well known, lenticular seal 46 is toroidal in shape and the platen 54 is circular, but formed from segments. This segmental structure has a tendency to grow radially inwardly at these high temperature levels and knife edges 48, 50 and 52 tend to grow radially outward. This combination of growths has the ultimate effect of minimizing the gap without the consequential minimal leakage and loss in engine performance.

It should be understood that the invention is not limited to the particular embodiments shown and described herein, but that various changes and modifications may be made without departing from the spirit and scope of this novel concept as defined by the following claims.

We claim:

1. A system for cooling turbine section rotation and stationary components contained in an engine casing and maintaining seal clearance between the rotating and stationary components at a minimum for a gas turbine engine having a compressor section, said seal having a portion connected to the stationary components and another portion connected to the rotational components and there being a gap therebetween, at least two separate ducts externally of said engine casing interconnecting the compressor section from a common source and turbine section whose components are intended to be expanded or contracted to maintain a minimum gap, valve means operable to a closed and opened position in one of said ducts and the other of said ducts having continuous feed at a restrictive capacity during the closure of said valve means whereby when minimum compressor air is required to maintain minimum clearance of said gap, said valve means is operated at the closed position.

2. A system as in claim 1 including a fixed restriction disposed in said continuous feed duct intermediate the compressor and turbine sections.

3. A system as in claim 2 wherein the turbine section components include a fixed vane having internal cooling passages and a lenticular seal in operating relationship therewith, feeding said passages with compressed air from said ducts, discharging a portion of said air into a cavity containing said lenticular seal at the upstream end relative to the gas flow of said engine for mixing with a portion of said gas flow for heating said lenticular seal to cause it to expand radially outward to a clearance closure direction.

4. A system as in claim 2 including means for controlling said valve means, said control means responding to an engine operating parameter.

5. A system as in claim 4 wherein said engine operating parameter is a temperature downstream of the compressor.

6. A system as in claim 4 including means responsive to a barometric pressure wherein said operating parameter is compressor rotational speed and said control means responds both to said barometric pressure and compressor speed.

* * * * *